US008237691B2

(12) United States Patent
Nakamura

(10) Patent No.: US 8,237,691 B2
(45) Date of Patent: Aug. 7, 2012

(54) DISPLAY DRIVER CIRCUIT AND DAC OF A DISPLAY DEVICE WITH PARTIALLY OVERLAPPING POSITIVE AND NEGATIVE VOLTAGE RANGES AND REDUCED TRANSISTOR BREAKDOWN VOLTAGE

(75) Inventor: Kazuo Nakamura, Ohtsu (JP)

(73) Assignee: Renesas Electronics Corporation, Kanagawa (JP)

( * ) Notice: Subject to any disclaimer, the term of this patent is extended or adjusted under 35 U.S.C. 154(b) by 1069 days.

(21) Appl. No.: 12/167,263

(22) Filed: Jul. 3, 2008

(65) Prior Publication Data

US 2009/0009538 A1 Jan. 8, 2009

(30) Foreign Application Priority Data

Jul. 4, 2007 (JP) ................................ 2007-176105

(51) Int. Cl.
*G06F 3/038* (2006.01)

(52) U.S. Cl. ........................................ 345/204; 341/144

(58) Field of Classification Search .................. 345/690, 345/89–100, 204, 211–213; 341/126–172
See application file for complete search history.

(56) References Cited

U.S. PATENT DOCUMENTS

| | | | | |
|---|---|---|---|---|
| 5,510,748 | A * | 4/1996 | Erhart et al. | 327/530 |
| 6,750,839 | B1 * | 6/2004 | Hogan | 345/98 |
| 2007/0097060 | A1 * | 5/2007 | Takahashi | 345/98 |
| 2007/0229321 | A1 * | 10/2007 | Takabayashi | 341/50 |
| 2008/0055134 | A1 * | 3/2008 | Li et al. | 341/144 |
| 2008/0186079 | A1 * | 8/2008 | Kushima et al. | 327/434 |

FOREIGN PATENT DOCUMENTS

| | | |
|---|---|---|
| JP | 4-204689 | 7/1992 |
| JP | 3206590 | 7/2001 |

* cited by examiner

*Primary Examiner* — Liliana Cerullo
(74) *Attorney, Agent, or Firm* — Young & Thompson

(57) ABSTRACT

A display driver circuit of a display device includes: a first DA converter for converting a digital data to a gray-scale potential within a first potential range; and a second DA converter for converting a digital data to a gray-scale potential within a second potential range lower than the first potential range. The first DA converter includes a first transistor of a first conductivity type outputting a gray-scale potential not less than the common potential. The second DA converter includes: a second transistor of the first conductivity type outputting a gray-scale potential not less than the common potential; and a third transistor of a second conductivity type outputting a gray-scale potential not more than the common potential. A substrate potential applied to a back gate of the second transistor is lower than a substrate potential applied to a back gate of the first transistor.

15 Claims, 7 Drawing Sheets

10

DISPLAY DRIVER CIRCUIT AND DAC OF A DISPLAY DEVICE WITH PARTIALLY OVERLAPPING POSITIVE AND NEGATIVE VOLTAGE RANGES AND REDUCED TRANSISTOR BREAKDOWN VOLTAGE

INCORPORATION BY REFERENCE

This application is based upon and claims the benefit of priority from Japanese patent application No. 2007-176105, filed on Jul. 4, 2007, the disclosure of which is incorporated herein in its entirely by reference.

BACKGROUND OF THE INVENTION

1. Field of the Invention

The present invention relates to a display driver circuit of a display device. In particular, the present invention relates to a display driver circuit of a display device employing an inversion driving method.

2. Description of Related Art

FIG. 1 is a block diagram schematically showing a configuration of a typical active-matrix liquid crystal display device 1. The liquid crystal display device 1 is provided with a display panel 2 on which an image is displayed. The display panel 2 has a plurality of pixels 3 arranged in a matrix form. Moreover, a plurality of scanning lines X1 to Xm and a plurality of source lines (data lines) Y1 to Yn are so formed as to intersect with each other at a plurality of intersections. The plurality of pixels 3 are arranged at the plurality of intersections, respectively.

Each pixel 3 has a TFT (Thin Film Transistor) 4 and a liquid crystal element 5. A gate terminal of the TFT 4 is connected to one scanning line X, a source terminal or a drain terminal of the TFT4 is connected to one source line Y. One end of the liquid crystal element 5 is connected to the drain terminal or the source terminal of the TFT 4, and the other end thereof is connected to a common electrode to which a predetermined common potential VCOM is applied. A pixel potential is applied to the one end of the liquid crystal element 5 from the source line Y through the TFT 4, and the common potential VCOM is applied to the other end of the liquid crystal element 5. It should be noted that the common potential VCOM is applied to the plurality of pixels 3 in common.

The scanning lines X1 to Xm are connected to a gate driver 6, and the source lines Y1 to Yn are connected to a source driver 7. A power source circuit 8 supplies power to each circuit. Moreover, the power source circuit 8 supplies the above-mentioned common potential VCOM to the display panel 2. A control circuit 9 controls an operation of each circuit. More specifically, the control circuit 9 outputs a scanning line drive timing signal to the gate driver 6 and also outputs a source line drive timing signal and a display data to the source driver 7 The display data (image data) is a digital data.

The gate driver 6 selects and drives the plurality of scanning lines X1 to Xm one by one in turn in accordance with the scanning line drive timing signal. On the other hand, the source driver 7 outputs pixel potentials corresponding to gray-scales of the display data to the respective source lines Y1 to Yn in accordance with the source line drive timing signal. As a result, the pixel potentials corresponding to the gray-scales of the display data are respectively applied to the pixels 3 connected to the selected one scanning line X. The scanning lines X1 to Xm are driven in turn and thereby an image is displayed on the display panel 2.

With regard to the typical liquid crystal display device 1, an "inversion driving method" such as a dot inversion driving method, a line inversion driving method and a frame inversion driving method is known as a technique for reducing flicker and suppressing deterioration of the liquid crystal element 5. According to the inversion driving method, "polarity" of the pixel potential applied to the pixels 3 is inverted every predetermined period, or the "polarity" is inverted between the adjacent pixels 3. For example, pixel potentials of the opposite polarities may be applied to the adjacent source lines Y1 and Y2 shown in FIG. 1 (dot inversion driving). Moreover, the polarity of the pixel potential may be inverted every one line period during which one scanning line X is driven (line inversion driving). Furthermore, the polarity of the pixel potential may be inverted every one frame period during which all the scanning lines X1 to Xm are driven (frame inversion driving). It should be noted that the "polarity" generally means whether the pixel potential is positive or negative as compared with the common potential VCOM of the common electrode.

FIG. 2 shows one example of a correspondence relation between the gray-scale and the pixel potential (gray-scale potential) in a case of 64-gradation representation. In the example shown in FIG. 2, the pixel potentials within a range between a potential VDD (e.g. power source potential) and a potential VSS (e.g. ground potential) are used. In the case of the inversion driving method, two types of pixel potentials, namely, a pixel potential on the positive polarity side and a pixel potential on the negative polarity side are used with respect to one gray-scale. For example, let us consider a case where the common potential VCOM is 0.5 VDD. In this case, potentials from 0.5 VDD to VDD equal to or higher than the common potential VCOM are used as the pixel potential on the positive polarity side. On the other hand, potentials from VSS to 0.5 VDD equal to or lower than the common potential VCOM are used as the pixel potential on the negative polarity side.

FIG. 3 schematically shows a configuration of the source driver 7 used in the liquid crystal display device 1 employing the inversion driving method. In particular, FIG. 3 shows a configuration for the dot inversion driving method, illustrating a configuration related to the two adjacent source lines Y1 and Y2. The source driver 7 shown in FIG. 3 includes: latch circuits 111 and 112, a cross switch 120, level shifters 131 and 132, gray-scale potential generation circuits 141 and 142, a DA converter 151 on the positive polarity side, a DA converter 152 on the negative polarity side, a cross switch 160, and output buffers 171 and 172.

The latch circuit 111 latches a display data DATA1 corresponding to a pixel potential V1 output to the source line Y1. On the other hand, the latch circuit 112 latches a display data DATA2 corresponding to a pixel potential V2 output to the source line Y2. The display data DATA1 is output to one of the level shifters 131 and 132 through the cross switch 120, while the display data DATA2 is output to the other of the level shifters 131 and 132 through the cross switch 120. The level shifters 131 and 132 convert potential levels of the received display data and output them to the DA converters 151 and 152, respectively.

The gray-scale potential generation circuit 141 outputs the gray-scale potentials from 0.5 VDD to VDD on the positive polarity side to the DA converter 151. The DA converter 151 on the positive polarity side converts the received display data to a corresponding one of the gray-scale potentials from 0.5 VDD to VDD. On the other hand, the gray-scale potential generation circuit 142 outputs the gray-scale potentials from VSS to 0.5 VDD on the negative polarity side to the DA converter 152. The DA converter 152 on the negative polarity side converts the received display data to a corresponding one of the gray-scale potentials from VSS to 0.5 VDD.

The gray-scale potentials obtained by the DA converters 151 and 152 are output to the output buffers 171 and 172 through the cross switch 160. Each of the output buffers 171 and 172 includes a voltage follower or the like. The output buffer 171 outputs the received one gray-scale potential as the pixel potential V1 to the source line Y1. On the other hand, the output buffer 172 outputs the received one gray-scale potential as the pixel potential V2 to the source line Y2. In this manner, the pixel potential V1 of the positive polarity (or the negative polarity) is output to the source line Y1 while the pixel potential V2 of the negative polarity (or the positive polarity) is output to the source line Y2. In other words, the pixel potentials of the opposite polarities are output to the adjacent source lines Y1 and Y2, respectively, and thus the dot inversion driving is achieved.

FIG. 4 shows an example of a circuit configuration of the source driver 7 shown in FIG. 3 that employs the inversion driving method (refer to Japanese Patent No. 3206590, for example). For simplicity, let us consider a case where one display data DATA is expressed by a two-bit data [D2, D1]. A bit D1B is the inverted bit of the bit D1, and a bit D2B is the inverted bit of the bit D2. Note that the latch circuits 111 and 112, the cross switch 120 and the level shifters 131 and 132 are not shown in FIG. 4. An output circuit 170 in FIG. 4 corresponds to the cross switch 160 and the output buffers 171 and 172 in FIG. 3.

The gray-scale potential generation circuit 141 has serially connected resistive elements and generates a plurality of gray-scale potentials VP1 to VP4 by resistive voltage division. More specifically, the gray-scale potential generation circuit 141 generates gray-scale potentials VP1, VP2, VP3 and VP4 (VP1>VP2>VP3>VP4) within the positive polarity potential range from 0.5 VDD to VDD, based on the potentials VDD, 0.5 VDD and so on. The plurality of gray-scale potentials VP1 to VP4 are output to the DA converter 151 on the positive polarity side The DA converter 151 consists of PMOS transistors Mp1 to Mp8. The potential VDD is applied to back gates of those PMOS transistors Mp1 to Mp8. The DA converter 151 selects one gray-scale potential VP corresponding to the display data [D2, D1] from the plurality of gray-scale potentials VP1 to VP4, and outputs the selected one gray-scale potential VP to the output circuit 170.

The gray-scale potential VP output from the DA converter 151 on the positive polarity side is within the positive polarity potential range from 0.5 VDD to VDD. Since the potential VDD is applied to the back gates of the PMOS transistors Mp5 to Mp8 in the output stage, a drain-substrate (drain-back gate) voltage is "0.5 VDD" at a maximum. Therefore, an intermediate-voltage MOS transistor having a breakdown voltage of about 0.7 to 0.8 VDD is satisfactory.

Similarly, the gray-scale potential generation circuit 142 has serially connected resistive elements and generates a plurality of gray-scale potentials VN1 to VN4 by resistive voltage division. More specifically, the gray-scale potential generation circuit 142 generates gray-scale potentials VN1, VN2, VN3 and VN4 (VN4>VN3>VN2>VN1) within the negative polarity potential range from VSS to 0.5 VDD, based on the potentials VSS, 0.5 VDD and so on. The plurality of gray-scale potentials VN1 to VN4 are output to the DA converter 152 on the negative polarity side. The DA converter 152 consists of NMOS transistors Mn1 to Mn8. The potential VSS is applied to back gates of those NMOS transistors Mn1 to Mn8. The DA converter 152 selects one gray-scale potential VN corresponding to the display data [D2, D1] from the plurality of gray-scale potentials VN1 to VN4, and outputs the selected one gray-scale potential VN to the output circuit 170.

The gray-scale potential VN output from the DA converter 152 on the negative polarity side is within the negative polarity potential range from VSS to 0.5 VDD. Since the potential VSS is applied to the back gates of the NMOS transistors Mn5 to Mn8 in the output stage, a drain-substrate (drain-back gate) voltage is "0.5 VDD" at a maximum. Therefore, an intermediate-voltage MOS transistor having a breakdown voltage of about 0.7 to 0.8 VSS is satisfactory.

The circuit configuration described above can be applied to the case of the positive polarity potential range and the negative polarity potential range as shown in FIG. 2. In recent years, however, application of the liquid crystal display device becomes more diverse and thus there is a case where the positive polarity potential range and the negative polarity potential range are required to partially overlap with each other. For example, a DA converter on the positive polarity side is required to output the gray-scale potential VP in a potential range from 0.4 VDD to VDD and a DA converter on the negative polarity side is required to output the gray-scale potential VN in a potential range from VSS to 0.6 VDD.

FIG. 5 conceptually shows such potential ranges. The DA converter on the positive polarity side is required to output the gray-scale potential VP within a first potential range RP (from VDD to 0.4 VDD). On the other hand, the DA converter on the negative polarity side is required to output the gray-scale potential VN within a second potential range RN (from 0.6 VDD to VSS). The first potential range RP and the second potential range RN partially overlap with each other. In this case, it is no longer possible to separate between the positive polarity and the negative polarity based on the common potential VCOM. The first potential range RP on the positive polarity side is defined as a potential range handled by the DA converter on the positive polarity side, while the second potential range RN on the negative polarity side is defined as a potential range handled by the DA converter on the negative polarity side.

Now let us consider a case where the potential ranges shown in FIG. 5 are handled by the DA converters 151 and 152 shown in FIG. 4. For example, the gray-scale potential VP4 handled by the PMOS transistors Mp4 and Mp8 in the DA converter 151 on the positive polarity side is the gray-scale potential 0.4 VDD lower than the common potential VCOM (=0.5 VDD). In this case, the PMOS transistor Mp8 may fail to output the desired gray-scale potential 0.4 VDD within a predetermined driving period, due to shortage of a gate-source voltage and a substrate bias effect. Also for example, the gray-scale potential VN4 handled by the NMOS transistors Mn1 and Mn5 in the DA converter 152 on the negative polarity side is the gray-scale potential 0.6 VDD higher than the common potential VCOM (=0.5 VDD). In this case, the NMOS transistor Mn5 may fail to output the desired gray-scale potential 0.6 VDD within a predetermined driving period, due to shortage of a gate-source voltage and the substrate bias effect.

As described above, when it is necessary to handle the potential ranges as shown in FIG. 5, the driving capability may be insufficient and thus satisfactory output characteristics may riot be obtained with the circuit configuration shown in FIG. 4. To avoid this problem, a MOS transistor where the driving capability is insufficient may be replaced by a CMOS transfer gate (refer to Japanese Laid-Open Patent Application JP-H04-204689, for example).

As an example, FIG. 6 shows a configuration of a DA converter 152' on the negative polarity side which is provided with a CMOS transfer gate. More specifically, the DA converter 152' is provided with PMOS transistors Mp9 and Mp10 in addition to the configuration of the DA converter 152 shown in FIG. 4. The potential VDD is applied to back gates of the PMOS transistors Mp9 and Mp10. The PMOS transistor Mp9 and the NMOS transistor Mn1 constitute one CMOS transfer gate, and the PMOS transistor Mp10 and the NMOS transistor Mn5 constitute another CMOS transfer gate. These CMOS transfer gates handle the above-described gray-scale potential VN4 higher than the common potential VCOM. It is supposed that sufficient driving capability can be obtained by replacing the DA converter 152 shown in FIG. 4 by the DA converter 152' shown in FIG. 6.

The inventor of the present application has recognized the following points. In FIG. 6, the gray-scale potential VN output from the DA converter 152' on the negative polarity side is within a potential range from VSS to 0.6 VDD. Since the potential VDD is applied to the back gate of the PMOS transistor Mp10 in the output stage, the maximum value of a drain-substrate (drain-back gate) voltage applied to the PMOS transistor Mp10 is "VDD−VSS". Thus, an intermediate-voltage MOS transistor having a breakdown voltage of about 0.7 to 0.8 VSS is not satisfactory for the PMOS transistor Mp10.

It is therefore necessary to use a high-voltage MOS transistor instead of the intermediate-voltage MOS transistor as the PMOS transistor Mp10 constituting the CMOS transfer gate in the output stage. The same applies not only to the DA converter on the negative polarity side but also to the DA converter on the positive polarity side.

As described above, in order to handle the potential ranges as shown in FIG. 5, it is necessary to replace some MOS transistors in a typical DA converter by CMOS transfer gates and further to change a part of the CMOS transfer gates to a high-voltage element. This leads to increase in a layout size of the DA converter as a whole. A rate of the layout size increase becomes higher as the number of gray-scale levels is increased.

SUMMARY

In one embodiment of the present invention, a display driver circuit of a display device is provided. The display driver circuit has: a first DA converter configured to convert a digital data to a gray-scale potential within a first potential range; and a second DA converter configured to convert a digital data to a gray-scale potential within a second potential range. The maximum and minimum values of the first potential range are respectively higher than the maximum and minimum values of the second potential range. The maximum and minimum values of the second potential range are respectively higher and lower than a common potential that is applied to pixels of the display device in common. The first DA converter includes a first PMOS transistor configured to output a first gray-scale potential not less than the common potential to an output terminal of the first DA converter. The second DA converter includes: a second PMOS transistor configured to output a second gray-scale potential not less than the common potential to an output terminal of the second DA converter; and a NMOS transistor configured to output a third gray-scale potential not more than the common potential to the output terminal of the second DA converter. A second substrate potential applied to a back gate of the second PMOS transistor is lower than a first substrate potential applied to a back gate of the first PMOS transistor.

In another embodiment of the present invention, a display driver circuit of a display device is provided. The display driver circuit has: a first DA converter configured to convert a digital data to a gray-scale potential within a first potential range; and a second DA converter configured to convert a digital data to a gray-scale potential within a second potential range. The maximum and minimum values of the first potential range are respectively higher than the maximum and minimum values of the second potential range. The maximum and minimum values of the first potential range are respectively higher and lower than a common potential that is applied to pixels of the display device in common. The first DA converter includes: a PMOS transistor configured to output a first gray-scale potential not less than the common potential to an output terminal of the first DA converter; and a first NMOS transistor configured to output a second gray-scale potential not more than the common potential to the output terminal of the first DA converter. The second DA converter includes a second NMOS transistor configured to output a third gray-scale potential not more than the common potential to an output terminal of the second DA converter. A first substrate potential applied to a back gate of the first NMOS transistor is higher than a second substrate potential applied to a back gate of the second NMOS transistor.

In still another embodiment of the present invention, a display driver circuit of a display device is provided. The display driver circuit has: a gray-scale potential generation circuit configured to generate gray-scale potentials within a potential range defined by a maximum value and a minimum value; and a DA converter configured to convert a digital data to any of the gray-scale potentials. A common potential is applied to pixels of the display device in common. The DA converter includes: a PMOS transistor configured to output a first gray-scale potential not less than the common potential to an output terminal of the DA converter; and a NMOS transistor configured to output a second gray-scale potential not more than the common potential to the output terminal of the DA converter. A potential at the output terminal is applied to diffusion regions of the PMOS transistor and the NMOS transistor in common. A first substrate potential applied to a back gate of the PMOS transistor is lower than a value obtained by adding a breakdown voltage of the PMOS transistor to the minimum value of the potential range. A second substrate potential applied to a back gate of the NMOS transistor is higher than a value obtained by subtracting a breakdown voltage of the NMOS transistor from the maximum value of the potential range. The breakdown voltage of the PMOS transistor is equal to the breakdown voltage of the NMOS transistor.

According to the display driver circuit thus configured, it is possible to enlarge a potential range that can be handled by a DA converter while suppressing an increase in a layout size of the DA converter.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

1. Overall Configuration

A display device according to an embodiment of the present invention is, for example, an active-matrix type liquid crystal display device. The liquid crystal display device drives a display panel by using the "inversion driving method" such as the dot inversion driving method. Therefore, both of a potential range on the positive polarity side and a potential range on the negative polarity side are used.

Figure 5:
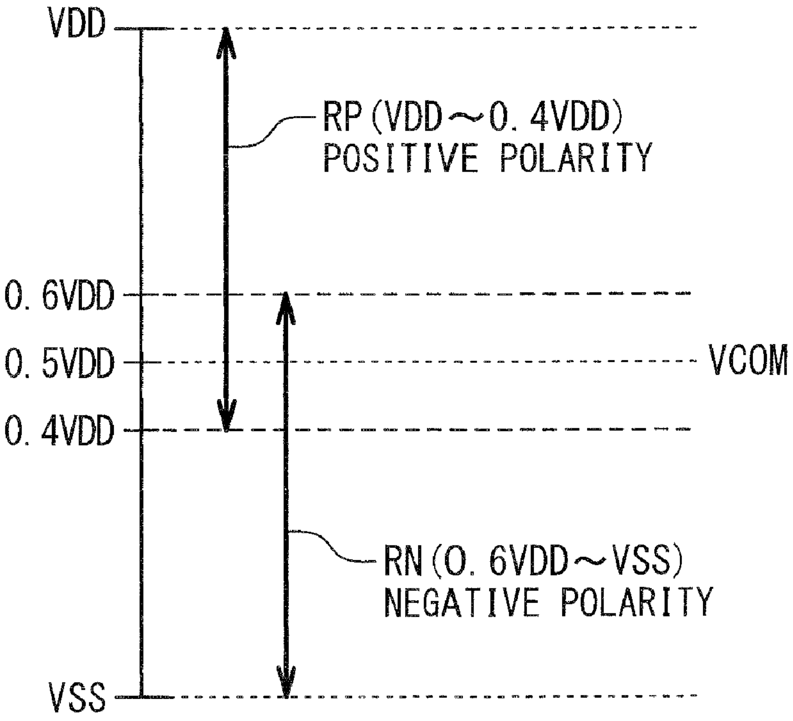
Fig. 5 Prior Art
FIG. 5 is a conceptual diagram showing a positive polarity potential range and a negative polarity potential range in a case where they partially overlap with each other.

As an example, let us consider a case where the potential ranges used in the present embodiment are the same as those shown in FIG. 5. More specifically, a DA converter on the positive polarity side handles the first potential range RP (from VDD to 0.4 VDD) defined by a maximum value VDD and a minimum value 0.4 VDD. On the other hand, a DA converter on the negative polarity side handles the second potential range RN (from 0.6 VDD to VSS) defined by a maximum value 0.6 VDD and a minimum value VSS. For example, the potential VDD is a power source potential and the potential VSS is a ground potential. The maximum value VDD of the first potential range RP is higher than the maximum value 0.6 VDD of the second potential range RN, and the minimum value 0.4 VDD of the first potential range RP is higher than the minimum value VSS of the second potential range RN. Moreover, the minimum value 0.4 VDD of the first potential range RP is lower than the maximum value 0.6 VDD of the second potential range RN. That is to say, the first potential range RP and the second potential range RN partially overlap with each other. The common potential VCOM applied to the common electrodes of the plurality of pixels 3 in common is equal to 0.5 VDD. Therefore, the maximum value VDD and the minimum value 0.4 VDD of the first potential range RP are respectively higher and lower than the common potential VCOM. Moreover, the maximum value 0.6 VDD and the minimum value VSS of the second potential range RN are respectively higher and lower than the common potential VCOM. In this manner, the first potential range RP and the second potential range RN include both of a potential higher than the common potential VCOM and a potential lower than the common potential VCOM.

Figure 1:
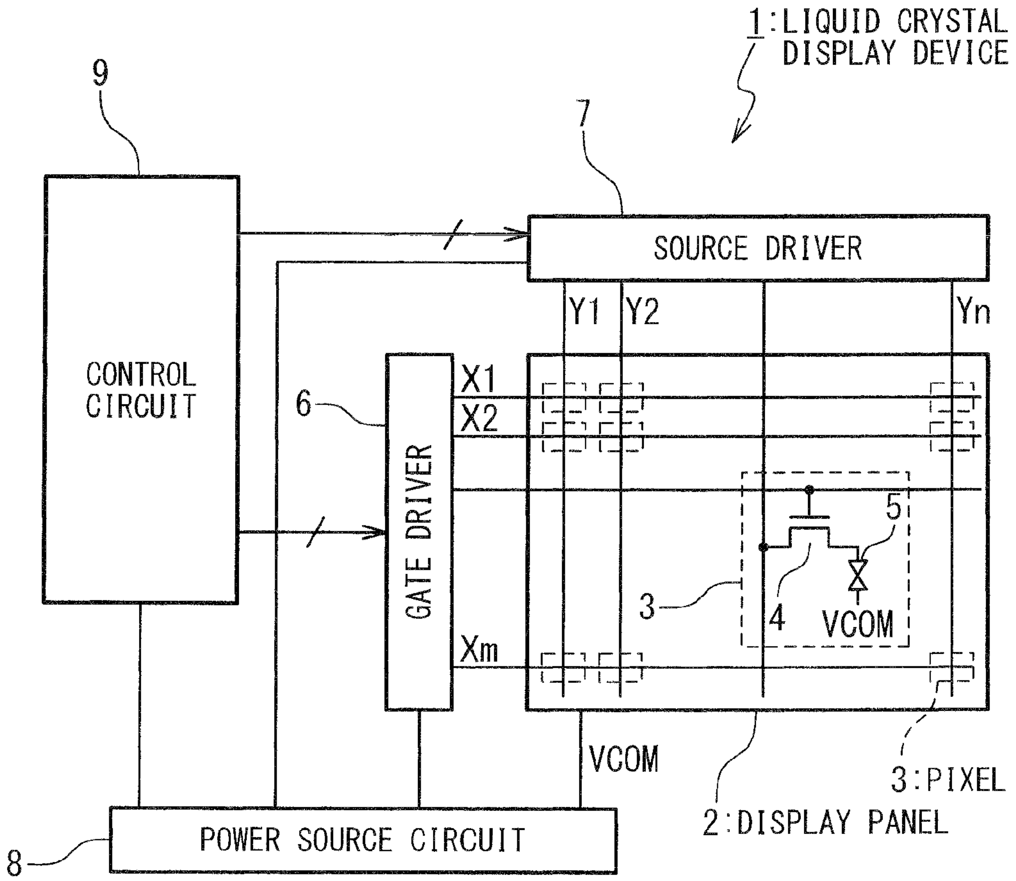
Fig. 1 Prior Art
FIG. 1 is a block diagram schematically showing a configuration of a liquid crystal display device.
Figure 2:
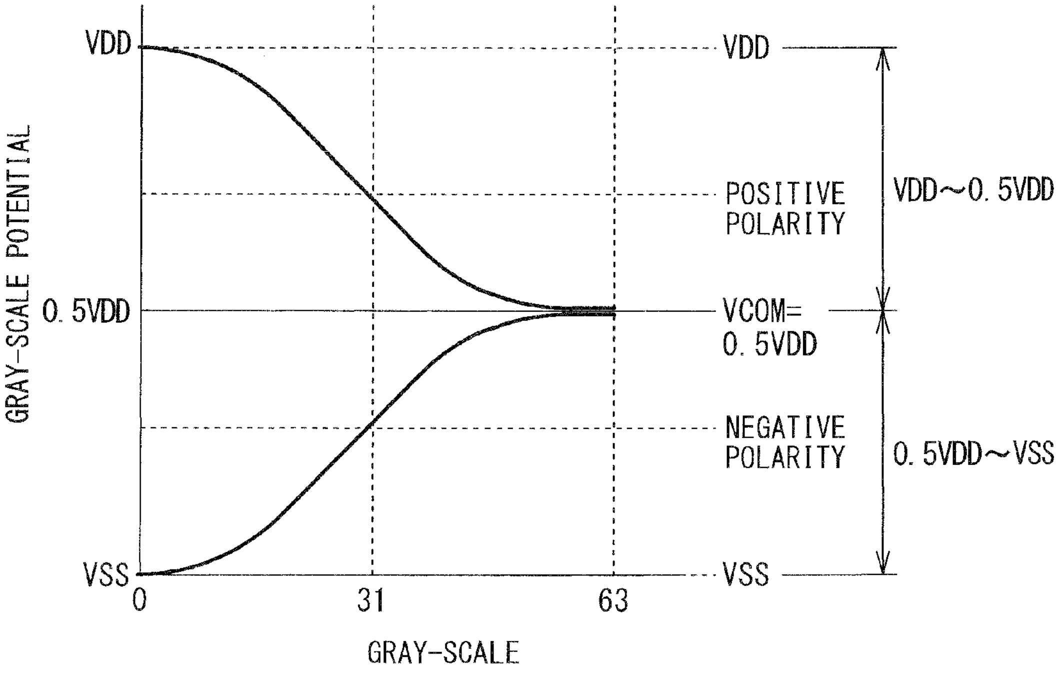
Fig. 2 Prior Art
FIG. 2 is a graph showing one example of a correspondence relation between gray-scale and pixel potential.
Figure 4:
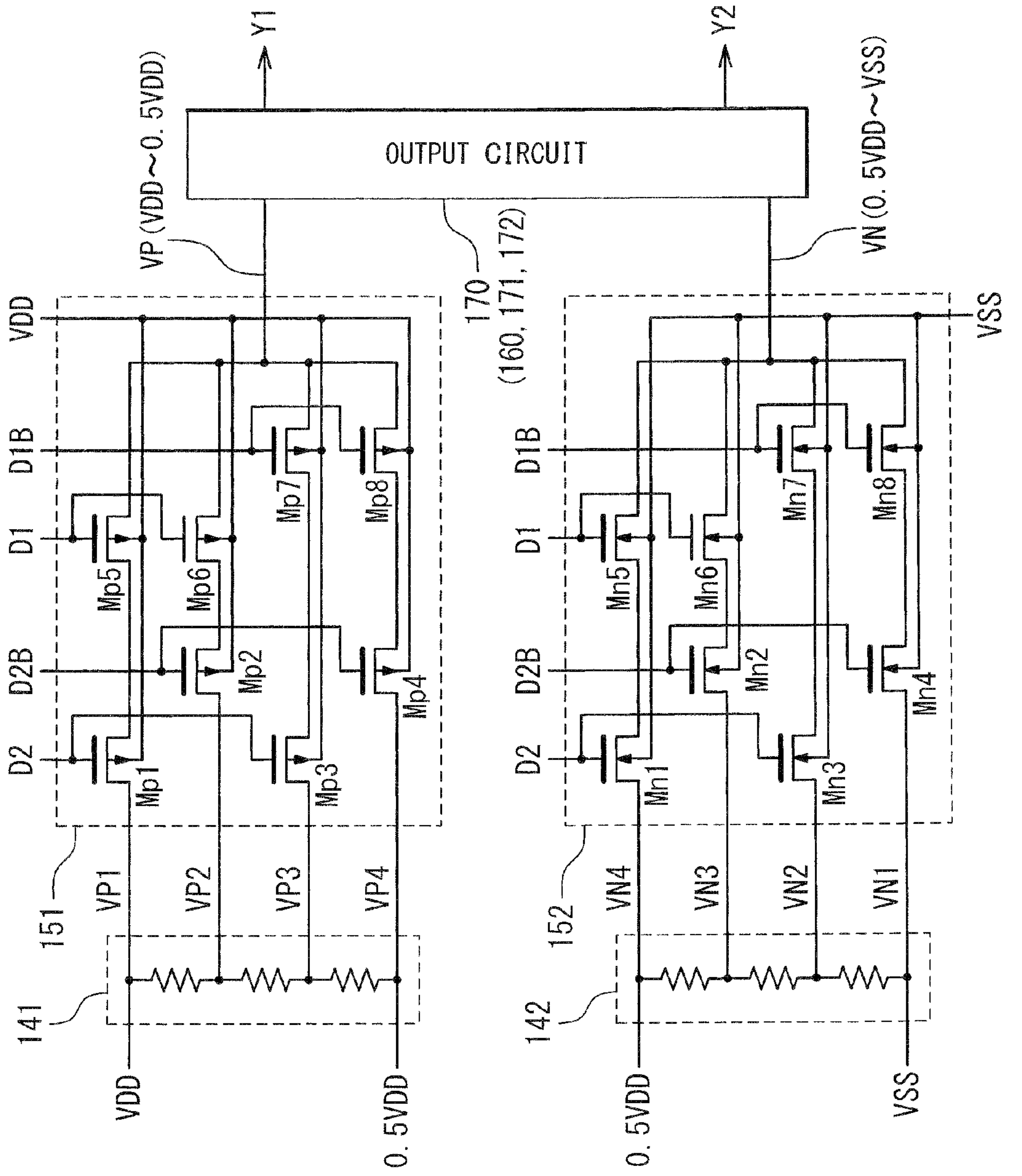
Fig. 4 Prior Art
FIG. 4 is a circuit diagram showing a configuration of the typical source driver.
Figure 6:
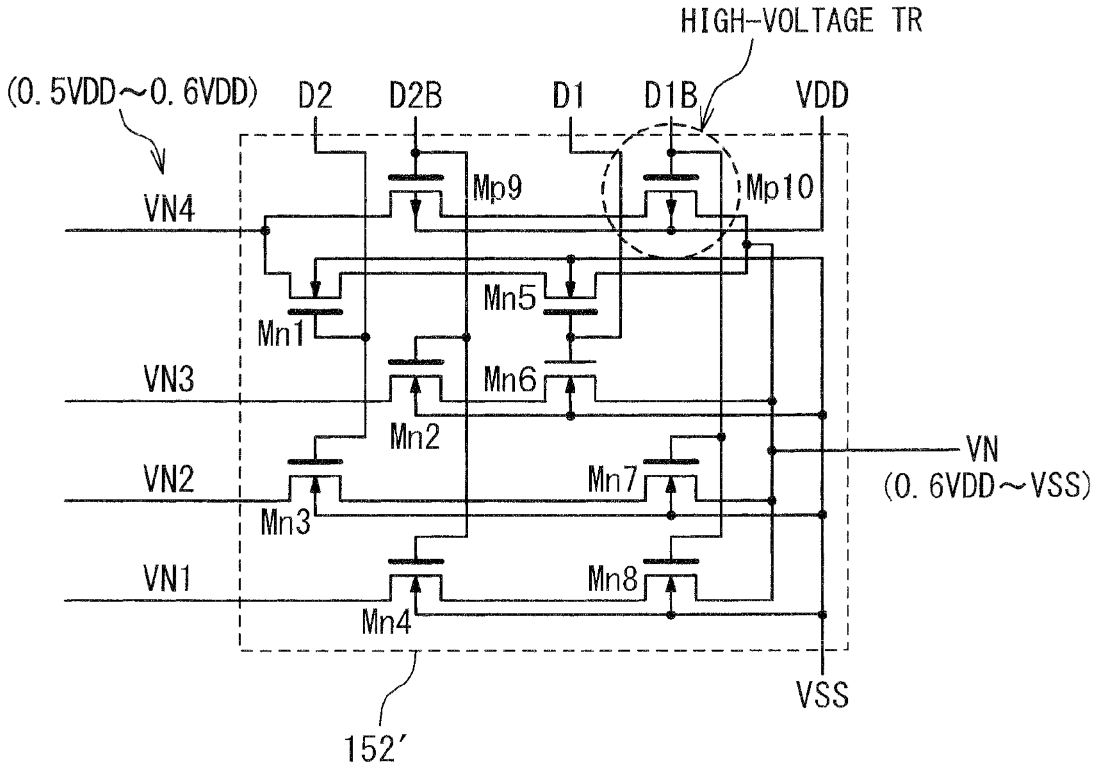
Fig. 6 Prior Art
FIG. 6 is a circuit diagram showing a configuration example of a DA converter.

The liquid crystal display device according to the present embodiment has the same configuration as that shown in FIG. 1 except for a configuration of the source driver. The liquid crystal display device according to the present embodiment is provided with a source driver 10 (display driver circuit) described below instead of the source driver shown in FIGS. 4 and 6. The source driver 10 according to the present embodiment will be described below in detail.

Figure 3:
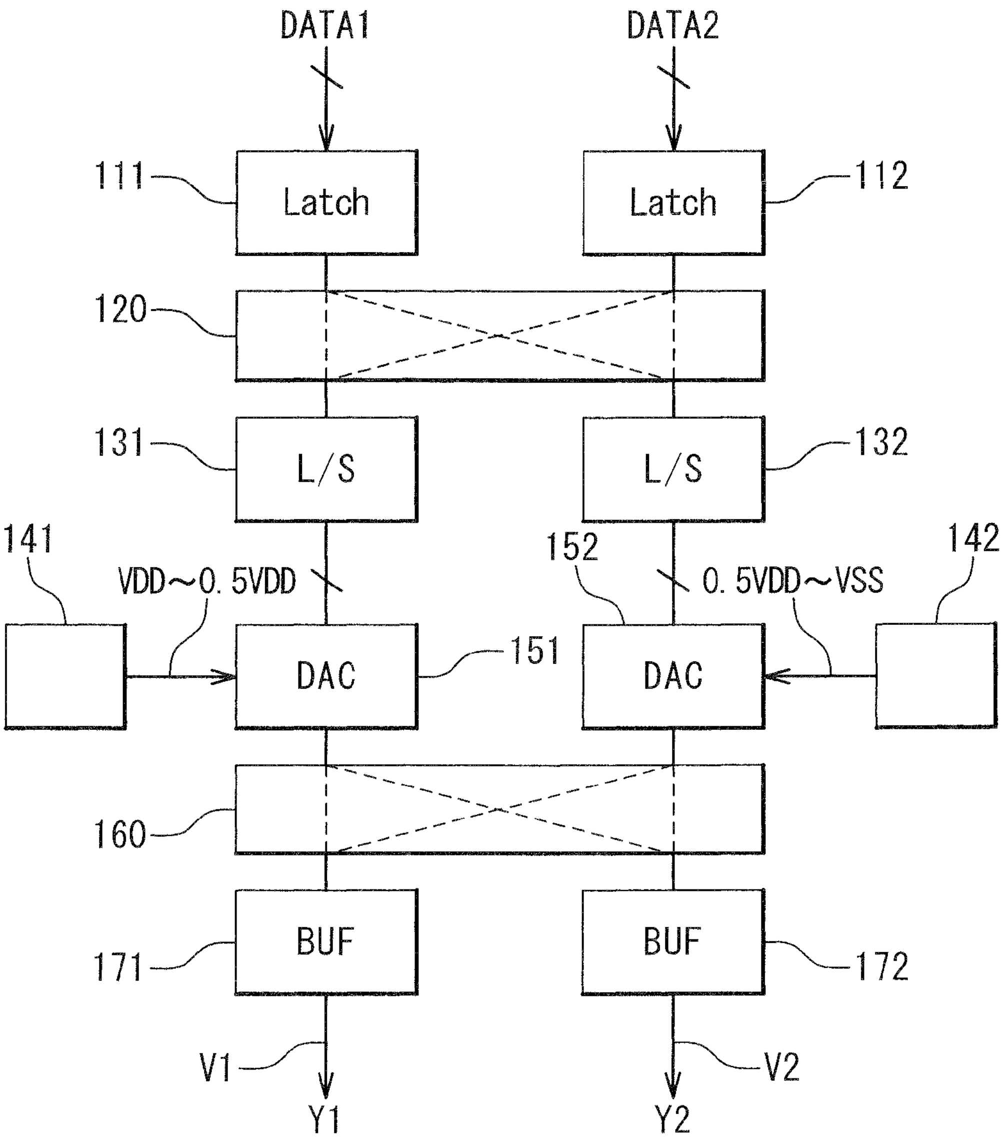
Fig. 3 Prior Art
FIG. 3 is a block diagram schematically showing a configuration of a typical source driver.
Figure 7:
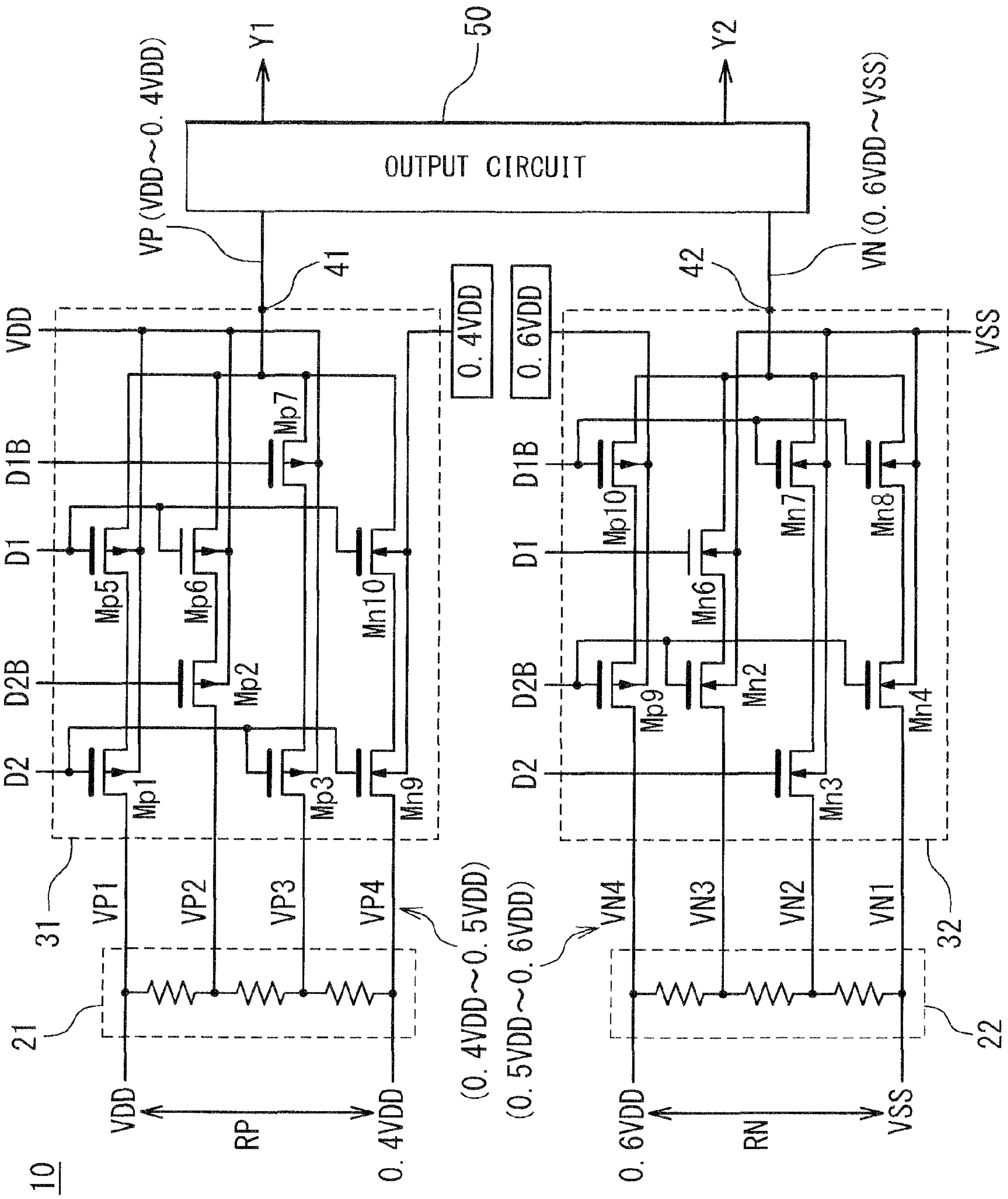
FIG. 7 is a circuit diagram showing a configuration of a source driver (display driver circuit) according to an embodiment of the present invention.

FIG. 7 is a circuit diagram showing a configuration of the source driver 10 according to the present embodiment. As shown in FIG. 7, the source driver 10 is provided with: a first gray-scale potential generation circuit 21, a second gray-scale potential generation circuit 22, a first DA converter 31, a second DA converter 32, and an output circuit 50. Latch circuits and level shifters are the same as those in FIG. 3 and not shown in FIG. 7.

The first gray-scale potential generation circuit 21 and the first DA converter 31 handle the first potential range RP (from VDD to 0.4 VDD) on the positive polarity side. On the other hand, the second gray-scale potential generation circuit 22 and the second DA converter 32 handle the second potential range RN (from 0.6 VDD to VSS) on the negative polarity side. Here, the "positive polarity" or the "negative polarity" does not necessarily mean positive or negative as compared with the common potential VCOM. The first potential range RP shown in FIG. 5 is the positive polarity potential range, and the second potential range RN shown in FIG. 5 is the negative polarity potential range.

For simplicity, let us consider a case where a DA converter converts a two-bit display data [D2, D1] into any of four kinds of gray-scale potentials. A bit D1B is the inverted bit of the bit D1, and a bit D2B is the inverted bit of the bit D2.

The first gray-scale potential generation circuit 21 has serially connected resistive elements and generates four kinds of gray-scale potentials VP1 to VP4 by resistive voltage division. More specifically, the first gray-scale potential generation circuit 21 generates gray-scale potentials VP1, VP2, VP3 and VP4 (VP1>VP2>VP3>VP4) within the first potential range RP, based on the potentials VDD, 0.4 VDD and so on. The plurality of gray-scale potentials VP1 to VP4 thus generated are output to the first DA converter 31.

The first DA converter 31 receives a first display data [D2, D1] and the gray-scale potentials VP1 to VP4. The first DA converter 31 selects one gray-scale potential VP corresponding to the display data [D2, D1] from the gray-scale potentials VP1 to VP4, and outputs the selected one gray-scale potential VP to an output terminal 41 of the first DA converter 31. In other words, the first DA converter 31 converts the received display data to the gray-scale potential VP within the first potential range RP, based on the gray-scale potentials VP1 to VP4. The obtained gray-scale potential VP is output from the output terminal 41 of the first DA converter 31 to the output circuit 50.

The second gray-scale potential generation circuit 22 has serially connected resistive elements and generates four kinds of gray-scale potentials VN1 to VN4 by resistive voltage division. More specifically, the second gray-scale potential generation circuit 22 generates gray-scale potentials VN1, VN2, VN3 and VN4 (VN4>VN3>VN2>VN1) within the second potential range RN, based on the potentials 0.6 VDD, VSS and so on. The plurality of gray-scale potentials VN1 to VN4 thus generated are output to the second DA converter 32.

The second DA converter 32 receives a second display data [D2, D1] and the gray-scale potentials VN1 to VN4. The second DA converter 32 selects one gray-scale potential VN corresponding to the display data [D2, D1] from the gray-scale potentials VN1 to VN4, and outputs the selected one gray-scale potential VN to an output terminal 42 of the second DA converter 32. In other words, the second DA converter 32 converts the received display data to the gray-scale potential VN within the second potential range RN, based on the gray-scale potentials VN1 to VN4. The obtained gray-scale potential VN is output from the output terminal 42 of the second DA converter 32 to the output circuit 50.

The output circuit 50 is provided between the source lines Y1, Y2 and the output terminals 41, 42 of the DA converters 31, 32. The output circuit 50 is the same as the output circuit 170 in FIG. 4, and includes a cross switch, voltage followers and the like. The gray-scale potential VP output from the first DA converter 31 is output as a pixel potential to one of the adjacent source lines Y1 and Y2. The gray-scale potential VN output from the second DA converter 32 is output as a pixel potential to the other of the adjacent source lines Y1 and Y2. The pixel potential VP or VN and the common potential VCOM are respectively applied to the both ends of a liquid crystal element 5 of a pixel 3 connected to the source line. Thus, the dot inversion driving is achieved. Moreover, the line inversion driving and frame inversion driving can be achieved by switching the pixel potential between VP and VN every predetermined period.

Hereinafter, the DA converters 31 and 32 according to the present embodiment will be described in more detail.

2. First DA Converter on the Positive Polarity Side

As shown in FIG. 7, the first DA converter 31 includes PMOS transistors Mp1 to Mp3, Mp5 to Mp7 and NMOS transistors Mn9 and Mn10. The PMOS transistors Mp1 and Mp5 constitute a pair. The PMOS transistors Mp2 and Mp6 constitute another pair. The PMOS transistors Mp3 and Mp7 constitute still another pair. The NMOS transistors Mn9 and Mn10 constitute still another pair. These four pairs are provided in parallel between the first gray-scale potential generation circuit 21 and the output terminal 41, and handle different gray-scale potentials VP1 to VP4 respectively.

The bits D2 and D1 are applied to respective gate terminals of the PMOS transistors Mp1 and Mp5. Therefore, the pair of the PMOS transistors Mp1 and Mp5 outputs the gray-scale potential VP1 to the output terminal 41 when both of the bits D2 and D1 are L level. The bits D2B and D1 are applied to respective gate terminals of the PMOS transistors Mp2 and Mp6. Therefore, the pair of the PMOS transistors Mp2 and Mp6 outputs the gray-scale potential VP2 to the output terminal 41 when the bit D2 is H level and the bit D1 is L level. The bits D2 and D1B are applied to respective gate terminals of the PMOS transistors Mp3 and Mp7. Therefore, the pair of the PMOS transistors Mp3 and Mp7 outputs the gray-scale potential VP3 to the output terminal 41 when the bit D2 is L level and the bit D1 is H level. The bits D2 and D1 are applied to respective gate terminals of the NMOS transistors Mn9 and Mn10. Therefore, the pair of the NMOS transistors Mn9 and Mn10 outputs the gray-scale potential VP4 to the output terminal 41 when both of the bits D2 and D1 are H level.

In this manner, the first DA converter 31 outputs any one of the four gray-scale potentials VP1 to VP4 depending on the digital data [D2, D1] as the gray-scale potential VP to the output terminal 41. Here, the gray-scale potentials VP1 to VP3 are equal to or higher than the common potential VCOM, and the gray-scale potential VP4 is equal to or lower than the common potential VCOM. That is to say, the gray-scale potential VP4 is in a range from 0.4 VDD to 0.5 VDD. For example, the gray-scale potential VP4 is 0.4 VDD lower than the common potential VCOM. The PMOS transistors Mp5 to Mp7 respectively output the gray-scale potentials VP1 to VP3 not less than the common potential VCOM to the output terminal 41. On the other hand, the NMOS transistor Mn10 outputs the gray-scale potential VP4 not more than the common potential VCOM to the output terminal 41.

As described above, the four kinds of gray-scale potentials VP1 to VP4 can appear as the gray-scale potential VP at the output terminal 41 of the first DA converter 31. In other words, the gray-scale potential VP within the first potential range RP (from VDD to 0.4 VDD) appears at the output terminal 41. The gray-scale potential VP is applied to diffusion regions (source or drain) of the PMOS transistors Mp5 to Mp7 and the NMOS transistor Mn10 in common. In order to form these MOS transistors with the "intermediate-voltage element", substrate potentials applied to respective back gates of those MOS transistors are set as follows according to the present embodiment.

A substrate potential BGP is applied to the back gates of the PMOS transistors Mp5 to Mp7. Since the minimum value of the gray-scale potential VP that appears at the output terminal 41 is "0.4 VDD", the maximum value of a source/drain-substrate (source/drain-back gate) voltage applied to the PMOS transistors Mp5 to Mp7 is "BGP−0.4 VDD". Therefore, when a breakdown voltage of each of the PMOS transistors Mp5 to Mp7 is VBP, the breakdown voltage VBP needs to satisfy the following relationship (1)

$$\text{breakdown voltage } VBP > \text{substrate potential } BGP - 0.4\ \text{VDD} \qquad (1):$$

The breakdown voltage VBP is larger than a value obtained by subtracting the minimum value 0.4 VDD of the first potential range RP from the substrate potential BGP. In other words, the substrate potential BGP is set lower than a value obtained by adding the breakdown voltage VBP to the minimum value 0.4 VDD of the first potential range RP. According to the present embodiment, the substrate potential BGP is set to the potential VDD that is the maximum value of the first potential range RP. As shown in FIG. 7, the potential VDD as the substrate potential BGP is applied to the back gates of the PMOS transistors Mp1 to Mp3 and Mp5 to Mp7. In this case, the breakdown voltage VBP just needs to be larger than 0.6 VDD. Therefore, an intermediate-voltage MOS transistor having a breakdown voltage of about 0.7 to 0.8 VDD is satisfactory for the PMOS transistors Mp1 to Mp3 and Mp5 to Mp7.

On the other hand, a substrate potential BGN is applied to the back gate of the NMOS transistor Mn10. Since the maximum value of the gray-scale potential VP that appears at the output terminal 41 is "VDD", the maximum value of a source/drain-substrate (source/drain-back gate) voltage applied to the NMOS transistor Mn10 is "VDD−BGN". Therefore, when a breakdown voltage of the NMOS transistor Mn10 is VBN, the breakdown voltage VBN needs to satisfy the following relationship (2).

$$\text{breakdown voltage } VBN > \text{VDD} - \text{substrate potential } BGN \qquad (2):$$

The breakdown voltage VBN is larger than a value obtained by subtracting the substrate potential BGN from the maximum value VDD of the first potential range RP. In other words, the substrate potential BGN is set higher than a value obtained by subtracting the breakdown voltage VBN from the maximum value VDD of the first potential range RP. According to the present embodiment, the substrate potential BGN is set to the potential 0.4 VDD that is the minimum value of the first potential range RP. As shown in FIG. 7, the potential 0.4 VDD as the substrate potential BGN is applied to the back gates of the NMOS transistors Mn9 and Mn10. In this case, the breakdown voltage VBN just needs to be larger than 0.6 VDD. Therefore, an intermediate-voltage MOS transistor having a breakdown voltage of about 0.7 to 0.8 VDD is satisfactory for the NMOS transistors Mn9 and Mn10.

According to the present embodiment, as described above, the substrate potential BGN applied to the back gate of the NMOS transistor Mn10 is not set to the typical potential VSS (refer to a NMOS transistor in the second DA converter 32 described later) but to the potential (0.4 VDD) higher than the typical potential VSS. Since the substrate potential BGN is set relatively high, the breakdown voltage VBN of the NMOS transistor Mn10 can be relatively small, as is clearly seen from the above-mentioned relational equation (2). In other words, it is possible to use an intermediate-voltage MOS transistor instead of a high-voltage MOS transistor as the NMOS transistor Mn10. In the present embodiment, it is possible to constitute the first DA converter 31 by using only the intermediate-voltage MOS transistors (without using any high-voltage MOS transistor).

It should be noted that the gray-scale potential VP4 handled by the NMOS transistors Mn9 and Mn10 is within a potential range from 0.4 VDD to 0.5 VDD. The potential range from 0.4 VDD to 0.5 VDD is close to the substrate potential 0.4 VDD applied to the back gates. Therefore, the ON resistances do not become too large and thus there is no problem in the output characteristics. It is possible to output the gray-scale potential VP4 sufficiently by the NMOS transistors Mn9 and Mn10 without using a CMOS transfer gate.

3. Second DA Converter on the Negative Polarity Side

As shown in FIG. 7, the second DA converter 32 includes NMOS transistors Mn2 to Mn4, Mn6 to Mn8 and PMOS transistors Mp9 and Mp10. The NMOS transistors Mn4 and Mn8 constitute a pair. The NMOS transistors Mn3 and Mn7 constitute another pair. The NMOS transistors Mn2 and Mn6 constitute still another pair. The PMOS transistors Mp9 and Mp10 constitute still another pair. These four pairs are provided in parallel between the second gray-scale potential generation circuit 22 and the output terminal 42, and handle different gray-scale potentials VN1 to VN4 respectively.

The bits D2B and D1B are applied to respective gate terminals of the NMOS transistors Mn4 and Mn8. Therefore, the pair of the NMOS transistors Mn4 and Mn8 outputs the gray-scale potential VN1 to the output terminal 42 when both of the bits D2 and D1 are L level. The bits D2 and D1B are applied to respective gate terminals of the NMOS transistors Mn3 and Mn7. Therefore, the pair of the NMOS transistors Mn3 and Mn7 outputs the gray-scale potential VN2 to the output terminal 42 when the bit D2 is H level and the bit D1 is L level. The bits D2B and D1 are applied to respective gate terminals of the NMOS transistors Mn2 and Mn6. Therefore, the pair of the NMOS transistors Mn2 and Mn6 outputs the gray-scale potential VN3 to the output terminal 42 when the bit D2 is L level and the bit D1 is H level. The bits D2B and D1B are applied to respective gate terminals of the PMOS transistors Mp9 and Mp10. Therefore, the pair of the PMOS transistors Mp9 and Mp10 outputs the gray-scale potential VN4 to the output terminal 42 when both of the bits D2 and D1 are H level.

In this manner, the second DA converter 32 outputs any one of the four gray-scale potentials VN1 to VN4 depending on the digital data [D2, D1] as the gray-scale potential VN to the output terminal 42. Here, the gray-scale potentials VN1 to VN3 are equal to or lower than the common potential VCOM, and the gray-scale potential VN4 is equal to or higher than the common potential VCOM. That is to say, the gray-scale potential VN4 is in a range from 0.5 VDD to 0.6 VDD. For example, the gray-scale potential VN4 is 0.6 VDD higher than the common potential VCOM. The NMOS transistors Mn6 to Mn8 respectively output the gray-scale potentials VN1 to VN3 not more than the common potential VCOM to the output terminal 42. On the other hand, the PMOS transistor Mp10 outputs the gray-scale potential VN4 not less than the common potential VCOM to the output terminal 42.

As described above, the four kinds of gray-scale potentials VN1 to VN4 can appear as the gray-scale potential VN at the output terminal 42 of the second DA converter 32. In other words, the gray-scale potential VN within the second potential range RN (from VSS to 0.6 VDD) appears at the output terminal 42. The gray-scale potential VN is applied to diffusion regions (source or drain) of the NMOS transistors Mn6 to Mn8 and the PMOS transistor Mp10 in common. In order to form these MOS transistors with the "intermediate-voltage element", substrate potentials applied to respective back gates of those MOS transistors are set as follows according to the present embodiment.

A substrate potential BGN is applied to the back gates of the NMOS transistors Mn6 to Mn8. Since the maximum value of the gray-scale potential VN that appears at the output terminal 42 is "0.6 VDD", the maximum value of a source/drain-substrate (source/drain-back gate) voltage applied to the NMOS transistors Mn6 to Mn8 is "0.6 VDD−BGN". Therefore, when a breakdown voltage of each of the NMOS transistors Mn6 to Mn8 is VBN, the breakdown voltage VBN needs to satisfy the following relationship (3).

$$\text{breakdown voltage } VBN > 0.6\text{ VDD} - \text{substrate potential } BGN \quad (3):$$

The breakdown voltage VBN is larger than a value obtained by subtracting the substrate potential BGN from the maximum value 0.6 VDD of the second potential range RN. In other words, the substrate potential BGN is set higher than a value obtained by subtracting the breakdown voltage VBN from the maximum value 0.6 VDD of the second potential range RN. According to the present embodiment, the substrate potential BGN is set to the potential VSS (ground potential) that is the minimum value of the second potential range RN. As shown in FIG. 7, the potential VSS as the substrate potential BGN is applied to the back gates of the NMOS transistors Mn2 to Mn4 and Mn6 to Mn8. In this case, the breakdown voltage VBN just needs to be larger than 0.6 VDD. Therefore, an intermediate-voltage MOS transistor having a breakdown voltage of about 0.7 to 0.8 VDD is satisfactory for the NMOS transistors Mn2 to Mn4 and Mn6 to Mn8.

On the other hand, a substrate potential BGP is applied to the back gate of the PMOS transistor Mp10. Since the minimum value of the gray-scale potential VN that appears at the output terminal 42 is "VSS", the maximum value of a source/drain-substrate (source/drain-back gate) voltage applied to the PMOS transistor Mp10 is "BGP−VSS". Therefore, when a breakdown voltage of the PMOS transistor Mp10 is VBP, the breakdown voltage VBP needs to satisfy the following relationship (4).

$$\text{breakdown voltage } VBP > \text{substrate potential } BGP - \text{VSS} \quad (4):$$

The breakdown voltage VBP is larger than a value obtained by subtracting the minimum value VSS of the second potential range RN from the substrate potential BGP. In other words, the substrate potential BGP is set lower than a value obtained by adding the breakdown voltage VBP to the minimum value VSS of the second potential range RN. According to the present embodiment, the substrate potential BGP is set to the potential 0.6 VDD that is the maximum value of the second potential range RN. As shown in FIG. 7, the potential 0.6 VDD as the substrate potential BGP is applied to the back gates of the PMOS transistors Mp9 and Mp10. In this case, the breakdown voltage VBP just needs to be larger than 0.6 VDD. Therefore, an intermediate-voltage MOS transistor having a breakdown voltage of about 0.7 to 0.8 VSS is satisfactory for the PMOS transistors Mp9 and Mp10.

According to the present embodiment, as described above, the substrate potential BGP applied to the back gate of the PMOS transistor Mp10 is not set to the typical potential VDD (refer to the PMOS transistor in the first DA converter 31 described above) but to the potential (0.6 VDD) lower than the typical potential VDD. Since the substrate potential BGP is set relatively low, the breakdown voltage VBP of the PMOS transistor Mp10 can be relatively small, as is clearly seen from the above-mentioned relational equation (4). In other words, it is possible to use an intermediate-voltage MOS transistor instead of a high-voltage MOS transistor as the PMOS transistor Mp10. In the present embodiment, it is possible to constitute the second DA converter 32 by using only the intermediate-voltage MOS transistors (without using any high-voltage MOS transistor).

It should be noted that the gray-scale potential VN4 handled by the PMOS transistors Mp9 and Mp10 is within a potential range from 0.5 VDD to 0.6 VDD. The potential range from 0.5 VDD to 0.6 VDD is close to the substrate potential 0.6 VDD applied to the back gates. Therefore, the ON resistances do not become too large and thus there is no problem in the output characteristics. It is possible to output the gray-scale potential VN4 sufficiently by the PMOS transistors Mp9 and Mp10 without using a CMOS transfer gate.

4. Effects

According to the present embodiment, as described above, a portion in FIG. 6 to which the CMOS transfer gate is applied is constituted by only a PMOS transistor or a NMOS transistor. That is to say, no CMOS transfer gate is necessary for handling the enlarged potential range RP or RN shown in FIG. 5.

In the first DA converter 31 on the positive polarity side, the NMOS transistors Mn9 and Mn10 handle the enlarged potential range from 0.4 VDD to 0.5 VDD. As to the potential range from 0.4 VDD to 0.5 VDD, sufficient output characteristics can be obtained by the NMOS transistors Mn9 and Mn10. Moreover, according to the present embodiment, it is possible to use an intermediate-voltage MOS transistor instead of a high-voltage MOS transistor as the NMOS transistors Mn9 and Mn10. Therefore, a layout size of the first DA converter 31 can be greatly reduced as compared with the circuit configuration shown in FIG. 6. In other words, it is possible to enlarge the first potential range RP handled by the first DA converter 31 while suppressing an increase in the layout size of the first DA converter 31.

In the second DA converter 32 on the negative polarity side, the PMOS transistors Mp9 and Mp10 handle the enlarged potential range from 0.5 VDD to 0.6 VDD. As to the potential range from 0.5 VDD to 0.6 VDD, sufficient output characteristics can be obtained by the PMOS transistors Mp9 and Mp10. Moreover, according to the present embodiment, it is possible to use an intermediate-voltage MOS transistor instead of a high-voltage MOS transistor as the PMOS transistors Mp9 and Mp10. Therefore, a layout size of the second DA converter 32 can be greatly reduced as compared with the circuit configuration shown in FIG. 6. In other words, it is possible to enlarge the second potential range RN handled by the second DA converter 32 while suppressing an increase in the layout size of the second DA converter 32.

It should be noted that the idea of the present invention can be applied to only one of the positive polarity side DA converter and the negative polarity side DA converter. Even in this case, the effect of reducing the layout size can be obtained to some extent. Preferably, the idea of the present invention is applied to both of the positive polarity side DA converter and the negative polarity side DA converter, as shown in FIG. 7. As a result, the layout size is reduced remarkably.

Moreover, in a case where only the first potential range RP on the positive polarity side is enlarged, the first DA converter 31 according to the present embodiment is preferably used as the positive polarity side DA converter. In a case where only the second potential range RN on the negative polarity side is enlarged, the second DA converter 32 according to the present embodiment is preferably used as the negative polarity side DA converter. As a result, the same effects can be obtained.

It is apparent that the present invention is not limited to the above embodiments and may be modified and changed without departing from the scope and spirit of the invention.

What is claimed is:

1. A display driver circuit of a display device comprising:

a first digital to analog converter configured to convert a digital data to a gray-scale potential within a first potential range; and a second digital to analog converter configured to convert a digital data to a gray-scale potential within a second potential range, wherein maximum and minimum values of said first potential range are respectively higher than maximum and minimum values of said second potential range, and said maximum value of said second potential range is higher than a common potential that is applied to pixels of said display device in common, and said minimum value of the second potential range is lower than the common potential, wherein said first digital to analog converter includes a first transistor of a first conductivity type configured to output a first gray-scale potential not less than said common potential to an output terminal of said first digital to analog converter, wherein said second digital to analog converter includes:

a second transistor of said first conductivity type configured to output a second gray-scale potential not less than said common potential to an output terminal of said second digital to analog converter; and a third transistor of a second conductivity type different than the first conductivity type, configured to output a third gray-scale potential not more than said common potential to said output terminal of said second digital to analog converter, wherein a second substrate potential applied to a back gate of said second transistor is lower than a first substrate potential applied to a back gate of said first transistor.

2. The display driver circuit according to claim 1, wherein a breakdown voltage of said second transistor is larger than a value obtained by subtracting said minimum value of said second potential range from said second substrate potential.

3. The display driver circuit according to claim 1, wherein said first substrate potential is said maximum value of said first potential range, and said second substrate potential is said maximum value of said second potential range.

4. The display driver circuit according to claim 1, wherein said minimum value of said first potential range is lower than said common potential, and said first digital to analog converter further includes a fourth transistor of said second conductivity type configured to output a fourth gray-scale potential not more than said common potential to said output terminal of said first digital to analog converter, and wherein a third substrate potential applied to a back gate of said fourth transistor is higher than a fourth substrate potential applied to a back gate of said third transistor in said second digital to analog converter.

5. The display driver circuit according to claim 4, wherein a breakdown voltage of said fourth transistor is larger than a value obtained by subtracting said third substrate potential from said maximum value of said first potential range.

6. The display driver circuit according to claim 4, wherein said third substrate potential is said minimum value of said first potential range, and said fourth substrate potential is said minimum value of said second potential range.

7. The display driver circuit according to claim 1, wherein said first conductivity type is P-type, and said second conductivity type is N-type.

8. A display driver circuit of a display device comprising:

a first digital to analog converter configured to convert a digital data to a gray-scale potential within a first potential range; and a second digital to analog converter configured to convert a digital data to a gray-scale potential within a second potential range, wherein maximum and minimum values of said first potential range are respectively higher than maximum and minimum values of said second potential range, and said maximum value of said first potential range is higher than a common potential that is applied to pixels of said display device in common, and said minimum value of said first potential range wherein said first digital to analog converter includes:

a first transistor of a first conductivity type configured to output a first gray-scale potential not less than said common potential to an output terminal of said first digital to analog converter; and a second transistor of a second conductivity type different than the first conductivity type, configured to output a second gray-scale potential not more than said common potential to said output terminal of said first digital to analog converter, wherein said second digital to analog converter includes a third transistor of said second conductivity type configured to output a third gray-scale potential not more than said common potential to an output terminal of said second digital to analog converter, wherein a first substrate potential applied to a back gate of said second transistor is higher than a second substrate potential applied to a back gate of said third transistor.

9. The display driver circuit according to claim 8, wherein a breakdown voltage of said second transistor is larger than a value obtained by subtracting said first substrate potential from said maximum value of said first potential range.

10. The display driver circuit according to claim 8, wherein said first substrate potential is said minimum value of said first potential range, and said second substrate potential is said minimum value of said second potential range.

11. The display driver circuit according to claim 8, wherein said first conductivity type is P-type, and said second conductivity type is N-type.

12. A display driver circuit of a display device comprising:

a gray-scale potential generation circuit configured to generate gray-scale potentials within a potential range defined by a maximum value and a minimum value; and a digital to analog converter configured to convert a digital data to any of said gray-scale potentials, wherein a common potential is applied to pixels of said display device in common, wherein said digital to analog converter includes:

a first transistor of a first conductivity type configured to output a first gray-scale potential not less than said common potential to an output terminal of said digital to analog converter; and a second transistor of a second conductivity type different than the first conductivity type, configured to output a second gray-scale potential not more than said common potential to said output terminal of said digital to analog converter, wherein a potential at said output terminal is applied to diffusion regions of said first transistor and said second transistor in common, a first substrate potential applied to a back gate of said first transistor is lower than a value obtained by adding a breakdown voltage of said first transistor to said minimum value, a second substrate potential applied to a back gate of said second transistor is higher than a value obtained by subtracting a breakdown voltage of said second transistor from said maximum value, and said breakdown voltage of said first transistor is equal to said breakdown voltage of said second transistor, wherein said first substrate potential is said maximum value, and said second substrate potential is said minimum value.

13. The display driver circuit according to claim 12, wherein said first conductivity type is P-type, and said second conductivity type is N-type.

14. A circuit comprising:

a first digital to analog (D/A) converter including a first transistor of a first conductivity type configured to output a first electrical potential no less than a common potential within a first potential range;

a second digital to analog (D/A) converter including a second transistor of a second conductivity type different than the first conductivity type, configured to output a second electrical potential no more than the common potential within a second potential range, a maximum value of the second potential range being lower than a maximum value of the first potential range, wherein a minimum value of the first potential range is lower than the maximum value of the second potential range and higher than a minimum value of the second potential range, and wherein the second digital to analog (D/A) converter further includes a third transistor of the first conductivity type configured to output a third electrical potential more than the common potential within the second potential range, and wherein a back gate potential of the third transistor is lower than a back gate potential of the first transistor.

15. The circuit according to claim 14, wherein the first digital to analog (D/A) converter further includes a fourth transistor of the second conductivity type configured to output a fourth electrical potential less than the common potential within the first potential range, and wherein a back gate potential of the fourth transistor is higher than a back gate potential of the second transistor.

* * * * *